UNITED STATES PATENT OFFICE.

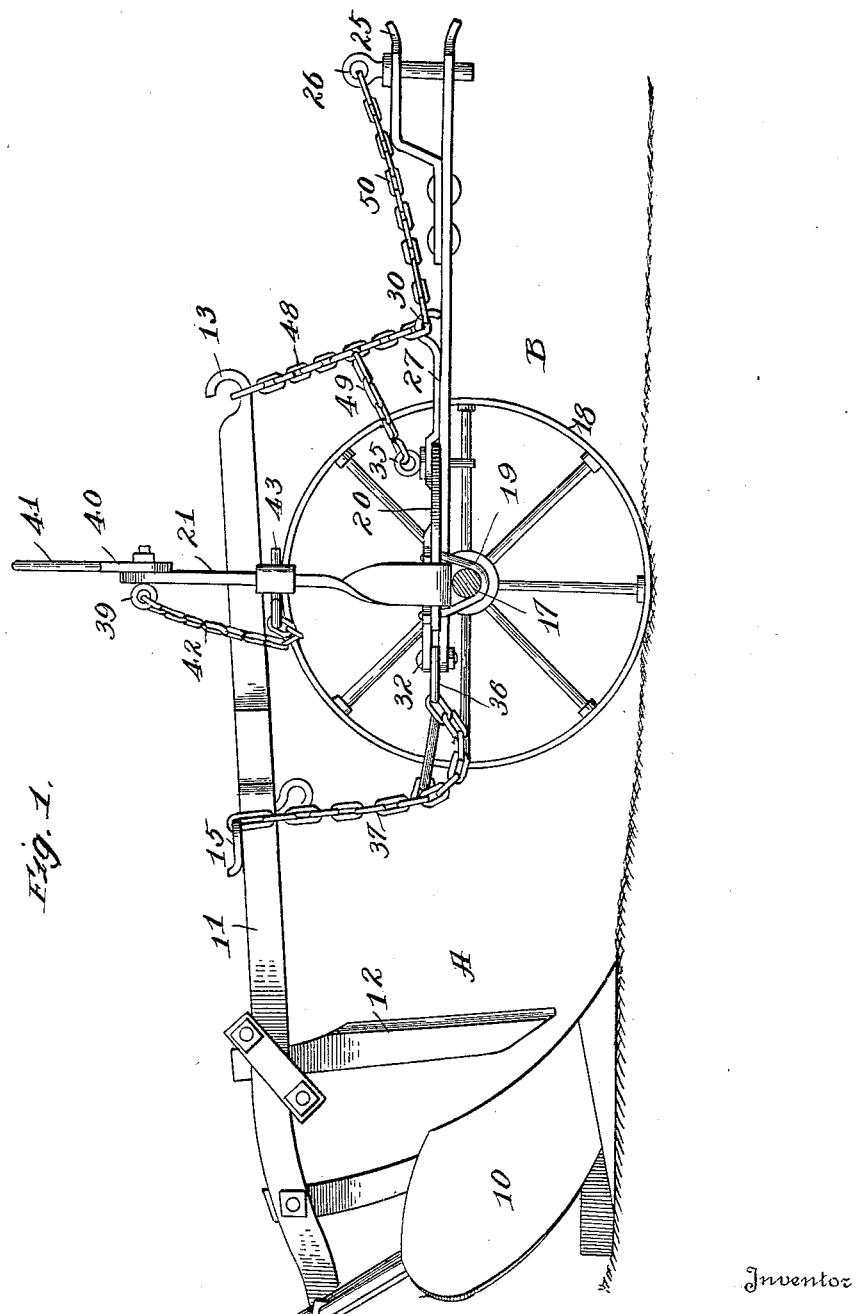

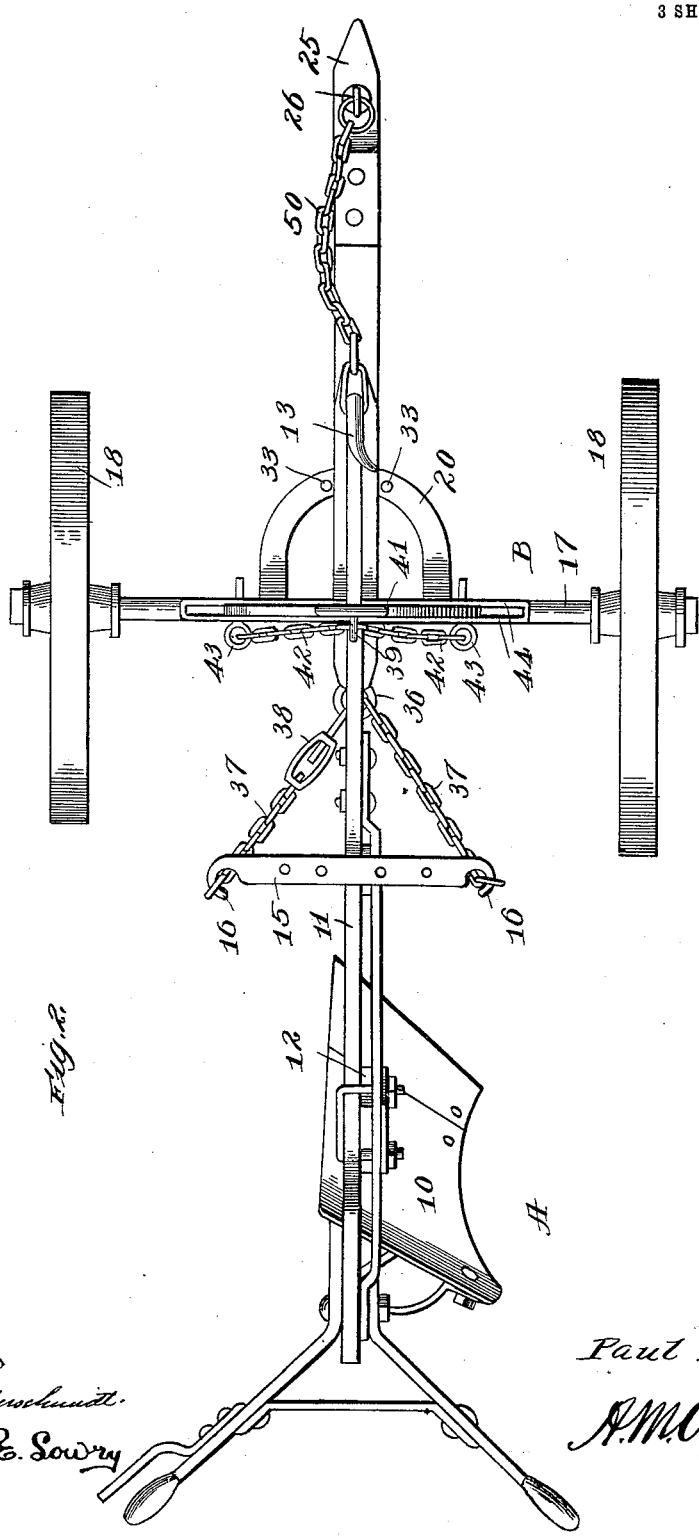

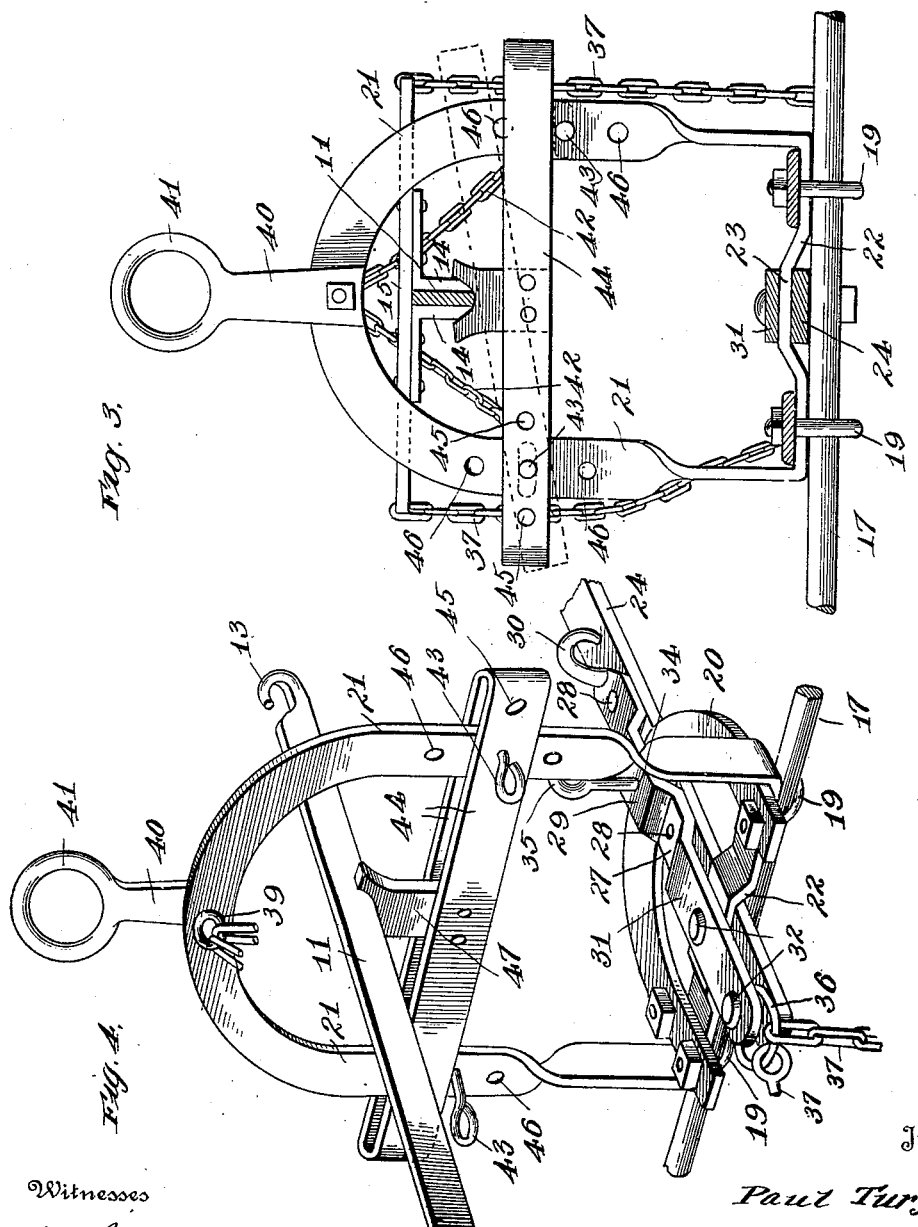

PAUL TURZIK, OF ENDICOTT, NEW YORK, ASSIGNOR OF ONE-HALF TO STEVE T. KRNA, OF BINGHAMTON, NEW YORK.

WHEEL-PLOW.

1,104,230.        Specification of Letters Patent.        Patented July 21, 1914.

Application filed December 8, 1913. Serial No. 805,317.

*To all whom it may concern:*

Be it known that I, PAUL TURZIK, a subject of the Emperor of Austria-Hungary, residing at Endicott, in the county of Broome and State of New York, have invented certain new and useful Improvements in Wheel-Plows, of which the following is a specification.

This invention relates to certain new and useful improvements in wheel plows.

An object of the invention is to provide a wheel plow with adjusting mechanism carried by the wheel carriage for elevating and lowering the plow beam to control the depth of the cut.

A further object of the invention is to provide means for shifting the plow beam laterally to control the width of the furrow cut.

A still further object of the invention is to provide a wheel plow with means for cleaning the wheel rims, the said means being brought into engagement with the wheels when the plow is turned.

With the above and other objects in view, which will appear as the nature of the invention is better understood, the same consists of the novel construction and arrangement of parts to be hereinafter more fully described and then claimed, reference being had to the accompanying drawings by like characters throughout the several views, and wherein:—

Figure 1 is a side elevational view of a wheel plow embodying my invention. Fig. 2 is a top plan view of the same. Fig. 3 is an enlarged front elevational view partly in section of the plow adjusting mechanism, and, Fig. 4 is an enlarged perspective view of the adjusting mechanism.

Referring more specifically to the drawings, the reference letter A designates a plow of the usual construction and B, the carriage frame. The plow A comprises the usual plow share 10 and beam 11. The beam 11 is provided adjacent the plow share 10 with a colter 12 of the usual construction while the forward end of the beam 11 is formed with a hook 13. The plow beam 11 at a suitable point intermediate its ends is provided with a pair of angle plates 14 suitably secured thereto and constituting supports for the transverse member 15. The ends of the transverse member 15 are provided with hooks, 16, for purposes to be hereinafter described. The carriage B comprises the axle 17 having mounted on each end thereof a wheel 18, one of said wheels being of smaller diameter than the other to permit one to be run in the furrow so that the plow will always assume a substantially horizontal position.

Secured to the axle 17, in any suitable manner, but preferably as shown, by staple bolts 19, is a semi-circular track or frame 20. An inverted substantially U-shaped frame 21 is provided and is connected at its lower ends by the strap 22. The strap 22 is formed integral with the frame 21 and at its connection with said frame it passes between the track 20 and the axle 17 and is rigidly held in such position. The central portion of the strap 22 is bent up for a portion of its length as at 23 and provides a clearance between itself and the axle 17 for the bar 24. The bar 24 at its outermost point is provided with the clevis strap 25, which clevis is provided with the usual removable pin 26. The bar 24 lies beneath the track 20 and is arranged between the bent up portion 23 of the strap 22 and the axle 17 and extends a distance rearwardly of said axle. A strap 27 is connected to the bar 24 as at 28 and is provided with an upstanding portion 29 to provide a clearance for the track 20 while the outer end of this strap 27 is provided with a hook 30. The rear end of the strap 27 is provided with an upstanding portion 31 which is disposed above the bent up portion 23 of the strap 22 and is suitably connected with the bar 24 as by bolts 32. The track 20 is provided with a plurality of openings 33 which are adapted to register with an opening 34 in the upstanding portion 29 of the strap 27 and inserted in said registering opening is a pin 35. The bolt 32 adjacent the end of the strap 27 and bar 24 receives a ring 36 and connected to said ring are a pair of chains 37, the other ends of said chains being each connected to the hooks 16 of the transverse member 15 and it is to be noted that one of said chains 37 is provided with a turnbuckle 38 to control the tension thereof.

Connected to the upper edge of the frame 21 as by a threaded eye-bolt 39 is a member 40 provided with an enlarged opening 41 in its upper end which constitutes a guide for the harness reins. The eye-bolt 39 has connected thereto a pair of chains 42, the other ends of said chains being connected to the eye-bolts 43. An inclosing strap member comprising the spaced walls 44 formed with integral ends is adapted to be received on the frame 21 and is permitted to move freely thereover. One end of the strap member is provided with a plurality of alined openings 45 which are brought into registry with openings 46 provided in the frame 21, the eye-bolts 43 carried by the chains 42 adapted to be inserted in the openings to position the strap member 44 with respect to the frame 21. Intermediate of the ends of the strap member 44 there is provided a supporting block 47 suitably recessed at its upper end to provide a seat for the plow beam 11. A chain 48 is connected at one of its ends to the hook 30 carried by the strap 27 and at its other end to the hook 13 of the plow beam. A second chain 49 is connected at one of its ends intermediate the ends of the chain 48 and carries upon its other end the pin 35 before mentioned. A third chain 50 is connected to the hook 30 and carries on its other end the clevis bolt 26.

In assembling the plow and carriage A and B, the beam 11 is inserted through the U-shaped frame 21 and rests on the block 47 carried by the strap member 44, the hook 13 carried by the beam having a chain connection 48 with the hook 30 carried by the strap 27 which is fixed to the bar 24. In order to regulate the depth of cut or the angularity of the plow share, the eyebolts 43 are removed from the openings 45 and 46 which will permit the strap member 44 to be adjusted with respect to height or angularity. It is to be noted that one of the eyebolts 43 passes through the registering openings 45 and 46 of the strap member and frame while the other of said eyebolts 43 passes through the opening 46 in the frame and constitutes a support for the lower edge of the strap member. When the carriage B turns in either direction, either of the chains 37 will contact or rub over the periphery of the wheels 18 and remove therefrom any matter that may have collected thereon.

While I have shown and described the preferred embodiment of my invention, I do not wish to confine myself thereto, as various modifications and arrangements of the parts as shown may be had without departing from the spirit and scope of the invention as claimed.

What I claim as new is:—

1. In a wheel-plow, the combination with the axle, of an inverted U-shaped frame provided with an integral strap connecting the lower ends of the sides of said frame, and having a central upward bend, a draft-bar between said bend and axle, a semi-circular track having its ends resting on said frame strap and secured to the axle, a transversely-disposed strap member having spaced walls between which said frame extends, means for securing said strap member to said frame at different adjustments, a plow beam, and a beam support projecting upward centrally between the walls of said strap member, and provided with a seat for said beam.

2. In a wheel-plow, the combination with the axle, of a frame of inverted U-shape formed with alined openings and having an integral strap connecting the lower ends of the sides of said frame, a draft-bar extending between said strap and the axle, a semicircular track having its ends secured to said frame strap, eyebolts securing said track to the axle, a transversely-disposed strap member having spaced walls between which said frame extends, and having openings adapted to register with those of said frame, eye-bolts for securing the strap member to the frame at different adjustments, a central beam support projecting upward from said strap member, and recessed at its upper end to provide a seat for the plow beam, a rein-support projecting upward centrally from said frame, an eye-bolt securing said support, and chain connections between said eye-bolt and the eye-bolts of said strap member.

3. In a wheel-plow, the combination with the axle, of a frame of inverted U-shape, having its ends connected by a strap secured to the axle, and bent upward centrally of its length, a longitudinally-extending bar provided with a clevis at its forward end, and having its rear end extending between the axle and the bend in said strap, a strap member vertically-adjustable upon said frame, a support recessed at its upper end and rigidly secured at its lower end between the parallel portions of said strap member, a beam resting on said support, and a chain connection between the front end of the beam and said longitudinal bar.

In testimony whereof I affix my signature in presence of two witnesses.

PAUL TURZIK.

Witnesses:
JOSEPH S. O'NEIL,
JAMES DALY.